United States Patent
Liu

(10) Patent No.: US 7,531,913 B2
(45) Date of Patent: May 12, 2009

(54) APPARATUS FOR PROVIDING VOLTAGES TO MOTHERBOARD

(75) Inventor: Xian-Fa Liu, Shenzhen (CN)

(73) Assignees: Hong Fu Jin Precision Industry (ShenZhen) Co., Ltd., ShenZhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 121 days.

(21) Appl. No.: 11/308,758

(22) Filed: Apr. 28, 2006

(65) Prior Publication Data

US 2007/0070662 A1    Mar. 29, 2007

(30) Foreign Application Priority Data

Sep. 23, 2005    (CN)    ................ 2005 1 0037473

(51) Int. Cl.
*H02J 1/00* (2006.01)
(52) U.S. Cl. ..................................................... 307/31

(58) Field of Classification Search ................... 307/31
See application file for complete search history.

(56) References Cited

U.S. PATENT DOCUMENTS

| | | | |
|---|---|---|---|
| 6,448,672 B1 * | 9/2002 | Voegeli et al. | ................ 307/52 |
| 6,815,845 B1 * | 11/2004 | McCallum | ................ 307/127 |
| 7,202,653 B2 * | 4/2007 | Pai | ................ 323/284 |

* cited by examiner

*Primary Examiner*—Stephen W Jackson
*Assistant Examiner*—Hal I Kaplan
(74) *Attorney, Agent, or Firm*—Wei Te Chung

(57) ABSTRACT

An apparatus for providing voltages to a motherboard includes a power supply, a first converting unit, a first regulating unit, and a driving unit. The first converting unit includes an input terminal connected to the power supply and an output terminal. The first regulating unit includes an input terminal, an output terminal, and a first switch unit. The input terminal of the first regulating unit is connected to the output terminal of the first converting unit. The output terminal is connected to the motherboard. The driving unit is connected to the output of the first regulating unit and outputs a signal to the motherboard.

11 Claims, 3 Drawing Sheets

APPARATUS FOR PROVIDING VOLTAGES TO MOTHERBOARD

FIELD OF THE INVENTION

The present invention relates to an apparatus for providing voltages to a motherboard, and particularly to an apparatus for providing multifold voltages to a motherboard to be tested.

DESCRIPTION OF RELATED ART

Generally, computers are mass produced. A motherboard is one of the most important parts in the computer. Typically, where the motherboards are mass produced, there exists a concern for making certain that the motherboard will perform within accepted design parameters. One important aspect of the performance evaluation involves determining whether the motherboard will perform reliably when placed in a working environment (e.g. under loads, or field conditions). Power supplies providing power and control signals to the motherboard are absolutely necessary. A first set of power supplies that provides working voltages such as 3.3V, 5V, and 12V for electronic components on the motherboard, and a second set of power supplies provides control signals such as a 5V stand by (SB) voltage, a power on (PWR_ON) voltage, and a power good (PWR_GD) voltage to control the electronic components are typically needed. In addition, in order to test the reliability of the motherboard more accurately, a third set of power supplies is needed to simulate real-world conditions by providing nominal and maximal voltages of 3.3V + or −7%, 5V+ or −7%, and 12V+ or −7% to the motherboard. During a conventional testing process, three different direct current power supplies are used. The conventional testing method and apparatus is too complex, expensive, and time-consuming.

What is needed is an apparatus that has a simple structure and can provide a variety of voltages for the motherboard to be tested.

SUMMARY OF THE INVENTION

An exemplary apparatus for providing voltages to a motherboard includes a power supply, a first converting unit, a first regulating unit, and a driving unit. The first converting unit includes an input terminal connected to the power supply and an output terminal. The first regulating unit includes an input terminal, an output terminal, and a first switch unit. The input terminal of the first regulating unit is connected to the output terminal of the first converting unit. The output terminal is connected to the motherboard. The driving unit is connected to the output of the first regulating unit and outputs a control signal to the motherboard. The first regulating unit directly outputs the voltage from the first converting unit to the motherboard, and/or regulates the voltage to be of a predetermined value by operation of the first switch unit. The present invention can provide multifold voltages to the motherboard and its operation is convenient.

Other objects, advantages and novel features will become more apparent from the following detailed description when taken in conjunction with the accompanying drawings, in which:

DETAILED DESCRIPTION OF THE INVENTION

Figure 1:
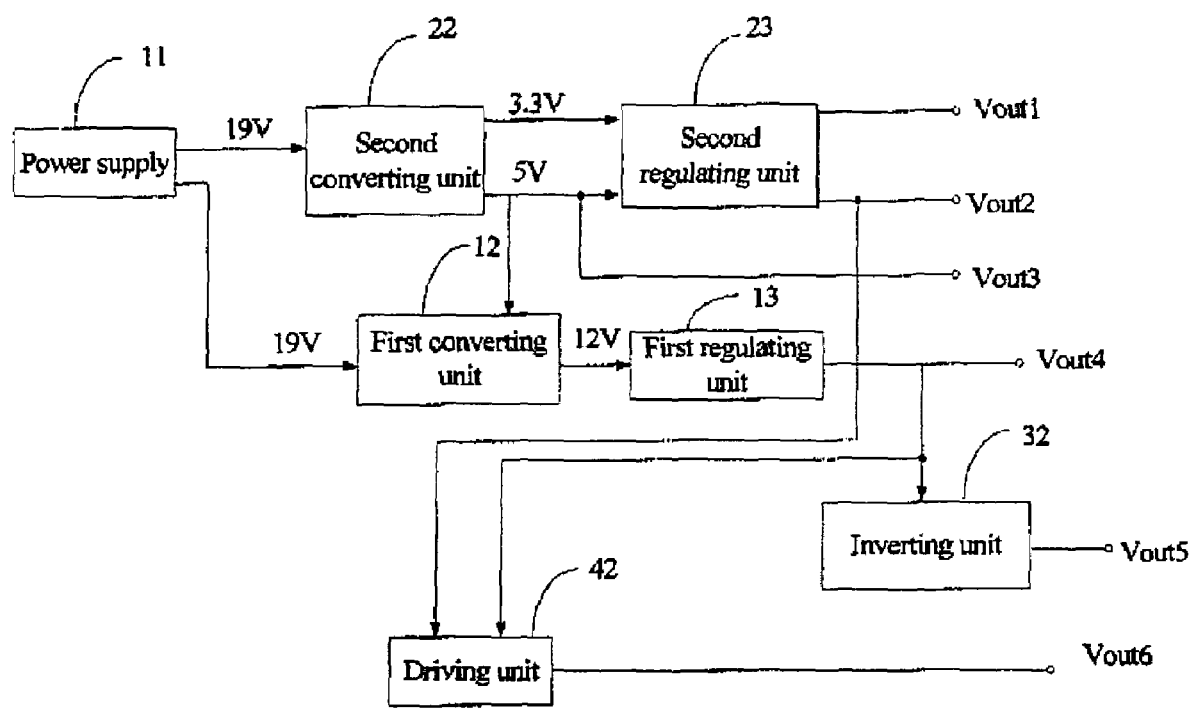
FIG. 1 is a block diagram of an apparatus for providing voltages for a motherboard, which includes a first converting unit, a second converting unit, a first regulating unit, and a second regulating unit, in accordance with a preferred embodiment of the present invention.

Referring to FIG. 1, a block diagram of an apparatus for providing voltages for a motherboard, in accordance with a preferred embodiment of the present invention is shown. The apparatus includes a power supply 11, a first converting unit 12, a first regulating unit 13, a second converting unit 22, a second regulating unit 23, a inverting unit 32, and a driving unit 42. The power supply 11 outputs 19 volts to the first converting unit 12 and the second converting unit 22. The first converting unit 12 converts the 19V to 12V that is input to the first regulating unit 13. The 12V voltage can be regulated to test values of 12V+ or −7% through the first regulating unit 13 and output to a terminal Vout4 and the inverting unit 32, or be directly output to the terminal Vout4 and the inverting unit 32. The third inverting unit 32 can invert a direction of the voltage from the first regulating unit 13, then the inverted voltage is input to a terminal Vout5. The second converting unit 22 converts the 19V voltage into a 3.3V voltage and a 5V voltage that are input to the second regulating unit 23. The 5V voltage is also input to the first converting unit 12. The first converting unit 12 outputs the 12V voltage only when it receives both the 5V voltage and the 19V voltage. The 5V voltage is also input to a terminal Vout3 as a 5V SB voltage. The 5V and 3.3V voltages can be respectively regulated to test values of 5V+ or −7% and 3.3V+ or −7% that are input to the terminals Vout1 and Vout2. The regulated voltages from the first regulating unit 13 and the second regulating unit 23 are input to a driving unit 42 to control the driving unit 42 to output a PWR_GD signal to a terminal Vout6. The terminals Vout1, Vout2, Vout3, Vout4, Vout5, and Vout6 are connected to the motherboard.

Figure 2:
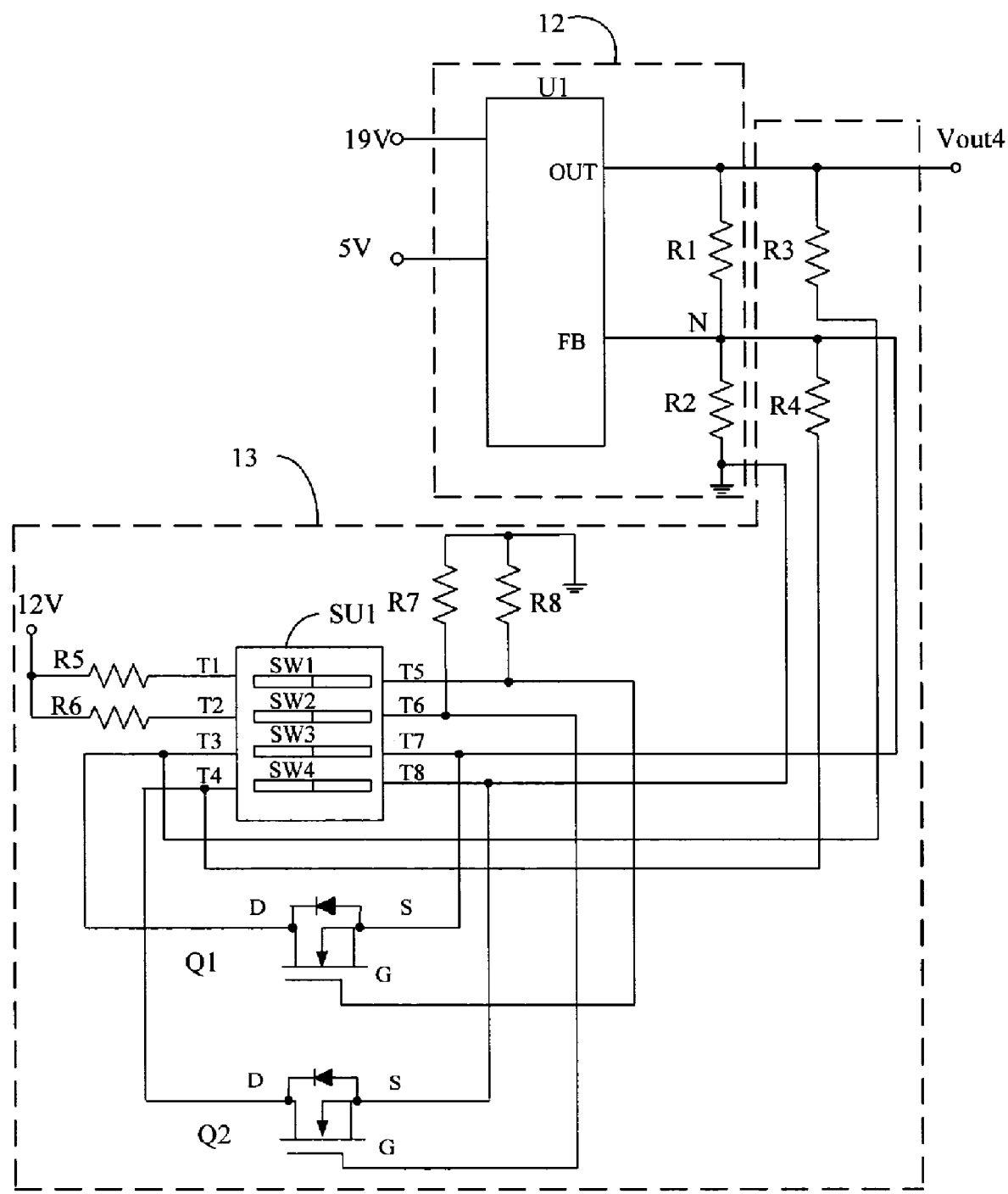
FIG. 2 is a circuit diagram of the first converting unit and the first regulating unit of FIG. 1.

Referring to FIG. 2, the first converting unit 12 includes a DC-DC converting chip U1, resistors R1 and R2, and the first regulating unit 13 includes a first Metal Oxide Semiconductor Field-Effect Transistor (MOSFET) Q1, a second MOSFET Q2, a first switch unit SU1, resistors R3, R4, R5, R6, R7, and R8. In this preferred embodiment, the type of the chip U1 is TPS40057. The MOSFET Q1 and the MOSFET Q2 are N-channel depletion MOSFETs. A 19V voltage from the power supply 11 and a 5V voltage from the second converting unit 22 are respectively input to two input terminals of the chip U1. The chip U1 has an output terminal OUT connected to the terminal Vout4 and a feedback terminal FB. The resistors R1 and R2 are connected between the terminal OUT and a ground in series. A node N between the resistors R1 and R2 is connected to the terminal FB.

The switch unit SU1 includes four switches, SW1 comprising terminals T1 and T5, SW2 comprising terminals T2 and T6, SW3 comprising terminals T3 and T7, and SW4 comprising terminals T4 and T8. The switches SW1, SW2, SW3, SW4 can be selectively turned on or off through operation of the SU1. Terminals T1 and T2 of the switch unit SU1 are respectively grounded through resistors R5 and R6. Terminals T3 and T4 are respectively connected to drains of the MOSFETs Q1 and Q2. Terminals T5 and T6 are respectively connected to gates of the MOSFETs Q1 and Q2. Terminals T7 and T8 are respectively connected to sources of the MOSFETs Q1 and Q2. The resistor R3 is connected between the terminal OUT of the chip U1 and the T3 of the switch unit SU1. The resistor R4 is connected between the terminal FB and the T4 of the switch unit SU1. The resistor R8 is connected between the T5 and the ground. The resistor R7 is connected between the T6 and the ground. The T7 is connected to the terminal FB and the T8 is grounded.

In this preferred embodiment, the terminal Vout4 outputs a 12V voltage when the switches SW1, SW2, SW3, SW4 are turned off. The voltage of the terminal Vout4 is calculated as follows where "Vn" is a voltage of the node N:

$$Vout = Vn \times \left(1 + \frac{R1}{R2}\right)$$

The terminal Vout4 outputs a test voltage of 12V−7%, when SW1 is turned on and SW2, SW3, and SW4 are turned off, or when SW3 is turned on and SW1, SW2, and SW4 are turned off. The resistor R3 is connected to the resistor R1 in parallel, so the voltage of the terminal Vout4 is calculated as follows:

$$Vout = Vn \times \left(1 + \frac{R1 \| R3}{R2}\right)$$

The terminal Vout4 outputs a test voltage of 12V+7%, when SW2 is turned on and SW1, SW3, and SW4 are turned off, or when SW4 is turned on and SW1, SW2, SW3 are turned off. The resistor R4 is connected to the resistor R2 in parallel, so the voltage of the terminal Vout4 is calculated as follows:

$$Vout = Vn \times \left(1 + \frac{R1}{R2 \| R4}\right)$$

Figure 3:
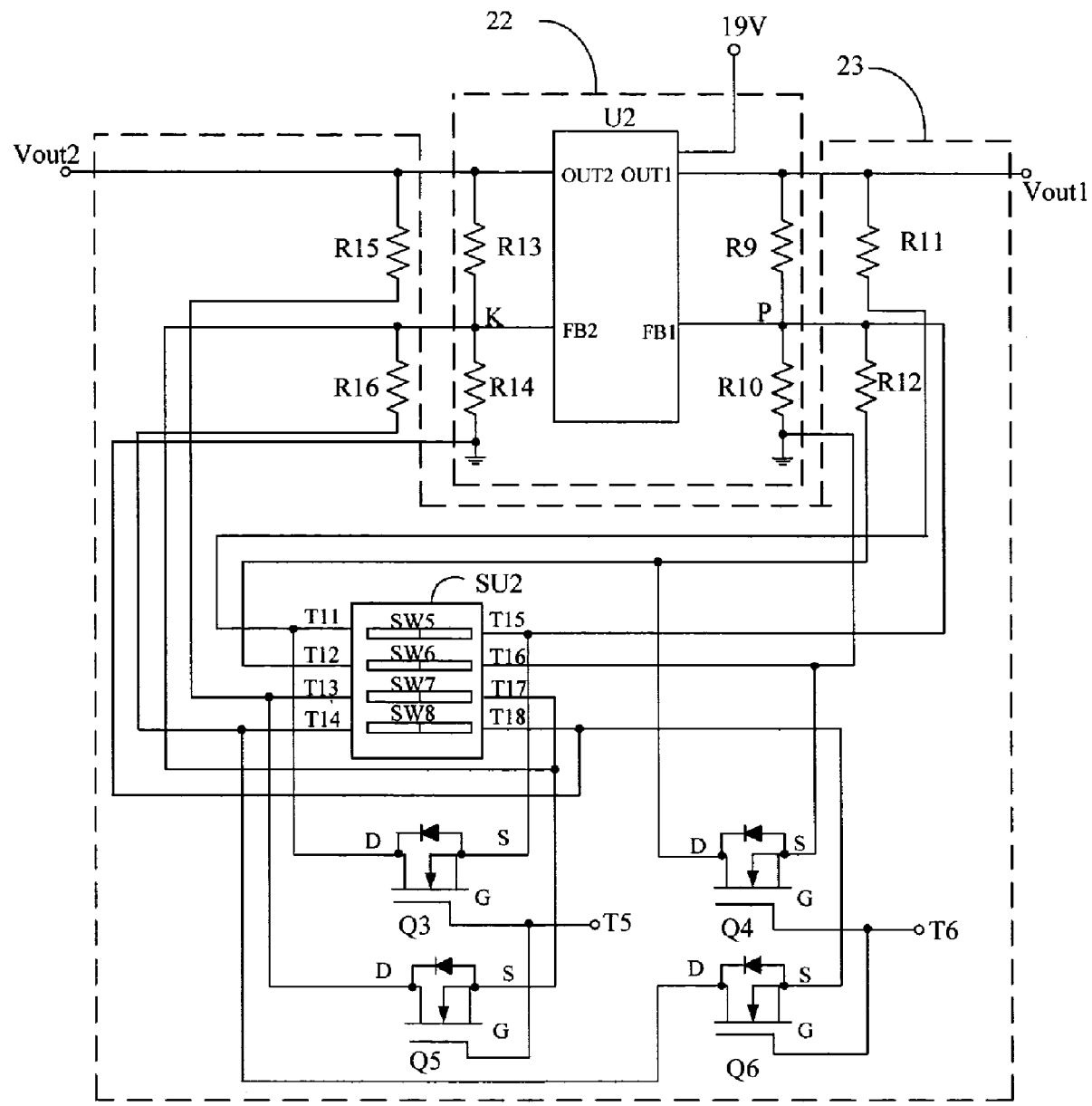
FIG. 3 is a circuit diagram of the second converting unit and the second regulating unit of FIG. 1.

Referring to FIG. 3, the second converting unit 22 includes a DC-DC converting chip U2, resistors R9, R10, R13, R14, and the second regulating unit 23 includes a switch unit SU2, the MOSFETs Q3, Q4, Q5, Q6, and resistors R11, R12, R15, R16. In this preferred embodiment, the type of the chip U2 is MAX1999. The MOSFETs Q3, Q4, Q5, and Q6 are N-channel depletion MOSFETs. A 19V voltage from the power supply 11 is input to an input terminal of the chip U2. The chip U2 has two output terminals OUT1, OUT2, and two feed back terminals FB1, FB2. The terminals OUT1 and OUT2 are connected to the terminals Vout1 and Vout2 respectively. The resistors R9 and R10 are connected between the terminal OUT1 and the ground in series. The resistors R13 and R14 are connected between the terminal OUT2 and the ground in series. A node P between the resistors R9 and R10 is connected to the terminal FB1. A node K between the resistors R13 and R14 is connected to the terminal FB2.

The switch unit SU2 includes four switches, SW5 including two terminals T11 and T15, SW6 including two terminals T12 and T16, SW7 including two terminals T13 and T17, and SW8 including two terminals T14 and T18. The switches SW5, SW6, SW7, SW8 can be selectively turned on or off through operation of the SU2. Terminals T11, T12, T13, and T14 are respectively connected to drains of the MOSFETs Q3, Q4, Q5 and Q6. Terminals T15, T16, T17 and T18 are respectively connected to sources of the MOSFETs Q3, Q4, Q5 and Q6. The resistor R11 is connected between T11 of the switch unit SU2 and the terminal out1 of the chip U2. The resistor R12 is connected between T12 of the switch unit SU2 and the terminal FB1 of the chip U2. The resistor R15 is connected between T13 of the switch unit SU2 and the terminal out2 of the chip U2. The resistor R16 is connected between T14 of the switch unit SU2 and the terminal FB2 of the chip U2. T15 and T17 are respectively connected to the terminals FB1 and FB2. T16 and T18 are grounded. A gate of the MOSFET Q3 is connected to a gate of the MOSFET Q5. A node between the gates of the MOSFETs Q3 and Q5 is connected to T5 of the switch unit SU1 of the first regulating unit 13. A gate of the MOSFET Q4 is connected to a gate of the MOSFET Q6. A node between the gates of the MOSFETs Q4 and Q6 is connected to T6 of the switch unit SU1.

The voltages of the terminals Vout1 and Vout2 can be regulated by operation of the switch unit SU2. A following table 1 shows voltage values of the terminals Vout1, Vout2, and Vout4, when the eight switches are in different states.

TABLE 1

| SW1 | ON | OFF | OFF | OFF | OFF | OFF | OFF | OFF | OFF |
|---|---|---|---|---|---|---|---|---|---|
| SW2 | OFF | ON | OFF | OFF | OFF | OFF | OFF | OFF | OFF |
| SW3 | OFF | OFF | ON | OFF | OFF | OFF | OFF | OFF | OFF |
| SW4 | OFF | OFF | OFF | ON | OFF | OFF | OFF | OFF | OFF |
| SW5 | OFF | OFF | OFF | OFF | OFF | ON | OFF | OFF | OFF |
| SW6 | OFF | OFF | OFF | OFF | OFF | OFF | ON | OFF | OFF |
| SW7 | OFF | OFF | OFF | OFF | OFF | OFF | OFF | ON | OFF |
| SW8 | OFF | OFF | OFF | OFF | OFF | OFF | OFF | OFF | ON |
| Vout1 (V) | 3.3× (1 − 7%) | 3.3× (1 + 7%) | 3.3 | 3.3 | 3.3 | 3.3× (1 − 7%) | 3.3× (1 + 7%) | 3.3 | 3.3 |
| Vout2 (V) | 5× (1 − 7%) | 5× (1 + 7%) | 5 | 5 | 5 | 5 | 5 | 5× (1 − 7%) | 5× (1 + 7%) |
| Vout3 (V) | 12× (1 − 7%) | 12× (1 + 7%) | 12× (1 − 7%) | 12× (1 + 7%) | 12 | 12 | 12 | 12 | 12 |

The above table 1 gives the values of the voltages of the terminals Vout1, Vout2 and Vout3 according to nine possible states of the first switch unit SU1 and the second switch unit SU2. For example, when SW4 is on and the remaining switches are off, Vout1 is 3.3V, Vout2 is 5V, and Vout3 is 12×(1+7%).

The inverting unit 32 includes a DC-DC converting chip which can invert a direction of the voltage from the second regulating unit 23. In this preferred embodiment, the type of the DC-DC converting chip is MC34063. Therefore, the present invention can provide a variety of voltages to the motherboard and its operation is convenient.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. An apparatus for providing voltages to a motherboard, the apparatus comprising:
   a power supply;
   a first converting unit comprising an input terminal, an output terminal, a first resistor, and a second resistor, the input terminal connected to the power supply, the first and second resistors being serially connected between the output terminal and ground;
   a first regulating unit comprising an input terminal, an output terminal, a first switch unit, a third resistor and a fourth resistor, the input terminal of the first regulating unit connected to the output terminal of the first converting unit, the output terminal of the first regulating unit connected to the motherboard, the first regulating unit feeding a voltage from the first converting unit to the motherboard, or regulating the voltage to be a predetermined voltage by operating the first switch unit to selectively allow either the third resistor to be connected in parallel with the first resistor or the fourth resistor to be connected in parallel with the second resistor; and
   a driving unit comprising an input terminal and en output terminal, the input terminal of the driving unit connected to the output terminal of the first regulating unit, the driving unit outputting a control signal to start up the motherboard according to the voltage from the first regulating unit.

2. The apparatus as claimed in claim 1, wherein the first converting unit comprises a first DC-DC converting chip for converting a voltage from the power supply, and the first DC-DC converting chip comprises a feed back terminal.

3. The apparatus as claimed in claim 2, wherein the first resistor is connected between the output terminal and the feed back terminal of the first DC-DC converting chip, the second resistor is connected between the feed back terminal and ground, and a node between the first resistor and the second resistor is connected to the first switch unit.

4. The apparatus as claimed in claim 3, wherein the first switch unit comprises a plurality of switches respectively used for controlling either the third resistor to be connected in parallel with the first resistor or the fourth resistor to be connected in parallel with the second resistor.

5. The apparatus as claimed in claim 1, further comprising a second converting unit and a second regulating unit, wherein the second converting unit and the second regulating unit each comprise an input terminal and an output terminal, and the second regulating unit further comprises a second switch unit, the input terminal of the second converting unit connected to the power supply, the output terminal of the second converting unit connected to the input terminal of the second regulating unit and another input terminal of the first converting unit, the output terminal of the second regulating unit connected to the motherboard said the input terminal of the driving unit, and the second regulating unit feeding the voltage from the second converting unit to the motherboard, or regulating the voltage to be a predetermined voltage by operating the second switch unit.

6. The apparatus as claimed in claim 1, farther comprising an inverting unit comprising an input terminal and an output terminal, wherein the input terminal of the inverting unit is connected to the output terminal of the first regulating unit, and the output terminal of the inverting unit is connected to the motherboard, the inverting unit inverting a direction of the voltage from the first regulating unit.

7. An apparatus for providing voltages to a motherboard, the apparatus comprising:
   a power supply;
   a converting unit comprising an input terminal, an output terminal, and a first resistor, the input terminal connected to the power supply, the first resistor connecting to the output terminal;
   a regulating unit comprising an output terminal, a second resistor, and a switch member, the second resistor connected to the output terminal of the converting unit the output terminal of the regulating unit connected to the motherboard, the switch member comprising at least two terminals respectively connecting to the first resistor and the second resistor; and
   an inverting unit comprising an input terminal and an output terminal, the input terminal of the inverting unit connected to the output terminal of the regulating unit, the output terminal of the inverting unit connected to the motherboard, for inverting a polarity of the voltage from the regulating unit.

8. The apparatus as claimed in claim 7, wherein the converting unit comprises a DC-DC converting chip for converting the voltage from the power supply, and the DC-DC converting chip comprises an output terminal and a feed back terminal.

9. The apparatus as claimed in claim 5, wherein the first resistor is connected between the output terminal and the feed back terminal of the DC-DC converting chip, and the converting unit further comprises a third resistor connected between the feed back terminal and ground.

10. The apparatus as claimed in claim 9, wherein the regulating unit comprises a fourth resistor connected between the switch member and the feed back terminal of the DC-DC converting chip, and the switch member comprising a plurality of switches operable to allow the second resistor to be connected with the first resistor in parallel, or the fourth resistor to be connected with the third resistor in parallel by operating the switches.

11. An apparatus for providing voltages to a motherboard, the apparatus comprising:
   a power supply;
   a first converting unit comprising an input terminal and an output terminal, the input terminal connected to the power supply;
   a first regulating unit comprising an input terminal, an output terminal, and a first switch, unit, the input terminal of the first regulating unit connected to the output terminal of the first converting unit, the output terminal of the first regulating unit connected to the motherboard, the first regulating unit feeding a voltage from the first converting unit to the motherboard, or regulating the voltage to be a predetermined voltage by operating the first switch unit;
   a second converting unit comprising an input terminal and an output terminal, the input terminal of the second converting unit being connected to the power supply, the output terminal of the second converting unit being connected to another input terminal of the first converting unit;

a second regulating unit comprising an input terminal, an output terminal, and a second switch unit, the input terminal of the second regulating unit being connected to the output terminal of the second converting unit, the output terminal of the second regulating unit connected to the motherboard, the second regulating unit feeding the voltage from the first converting unit to the motherboard, or regulating the voltage as a predetermined voltage by operating the second switch unit; and a driving unit comprising input terminals and an output terminal, the input terminals of the driving unit connected to the output terminal of the first regulating unit and the output terminal of the second regulating unit, the driving unit outputting a control signal to start up the motherboard according to the voltage from the first regulating unit.

* * * * *